United States Patent
Yu et al.

(10) Patent No.: US 11,250,278 B2
(45) Date of Patent: *Feb. 15, 2022

(54) IDENTIFICATION USING MOBILE DEVICE SIGNATURES AND CAMERAS

(71) Applicant: AT&T Intellectual Property I, L.P., Atlanta, GA (US)

(72) Inventors: Loc Yu, Seattle, WA (US); Chris Hagerty, Seattle, WA (US); Carlos Gutierrez Gomez, Seattle, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/744,553

(22) Filed: Jan. 16, 2020

(65) Prior Publication Data

US 2020/0151469 A1    May 14, 2020

Related U.S. Application Data

(63) Continuation of application No. 15/828,707, filed on Dec. 1, 2017, now Pat. No. 10,579,887.

(51) Int. Cl.
*G06K 9/00* (2006.01)
*G06F 16/50* (2019.01)
*G06F 16/58* (2019.01)

(52) U.S. Cl.
CPC ......... *G06K 9/00825* (2013.01); *G06F 16/50* (2019.01); *G06F 16/58* (2019.01);
(Continued)

(58) Field of Classification Search
None
See application file for complete search history.

(56) References Cited

U.S. PATENT DOCUMENTS 5,767,794 A    6/1998  Borsch et al.
6,690,294 B1   2/2004  Zierden
(Continued)

FOREIGN PATENT DOCUMENTS

CN    104361638 A    2/2015
EP    0 784 297 A2   7/1997
EP    0 802 515 A1   10/1997

OTHER PUBLICATIONS

Non-Final Office Action received for U.S. Appl. No. 15/828,707 dated Jun. 28, 2019, 25 pages.
(Continued)

*Primary Examiner* — Delomia L Gilliard
(74) *Attorney, Agent, or Firm* — Amin, Turocy & Watson, LLP

(57) ABSTRACT

A mesh of existing infrastructures is usable to identify user identities and communications devices with physical objects (e.g., transportation vehicles, apparel, etc.). A system can receive image data representative of images of physical objects captured (e.g., by a camera) at locations. The system can also receive signal data representative of signals from communications devices. Based on time data and location data associated with the image data and the signal data, the system can, after multiple iterations, determine whether one of the physical objects is correlated with one of the communications devices. In response to a correlation, the system can store in a record data (e.g., a container, database, etc.) data elements representative of the physical object and a second data element associated with the communications device.

20 Claims, 13 Drawing Sheets

(52) U.S. Cl.
CPC ..... *G06K 9/00785* (2013.01); *G06K 2209/15* (2013.01); *G06K 2209/23* (2013.01)

(56) References Cited

U.S. PATENT DOCUMENTS

| | | | |
|---|---|---|---|
| 6,705,521 | B1 | 3/2004 | Wu et al. |
| 6,958,676 | B1 | 10/2005 | Morgan et al. |
| 7,539,500 | B2 | 5/2009 | Chiang |
| 7,646,312 | B2 | 1/2010 | Rosen |
| 7,774,228 | B2 | 8/2010 | Robinson et al. |
| 7,817,013 | B2 | 10/2010 | Bazakos et al. |
| 7,986,339 | B2 | 7/2011 | Higgins |
| 8,473,333 | B2 | 6/2013 | Robinson et al. |
| 8,768,753 | B2 | 7/2014 | Robinson et al. |
| 8,774,527 | B1 * | 7/2014 | Anguelov .......... G06K 9/00704 382/209 |
| 9,165,288 | B2 | 10/2015 | Gordon et al. |
| 9,412,142 | B2 | 8/2016 | Pederson |
| 9,679,210 | B2 | 6/2017 | Sutton et al. |
| 9,688,282 | B2 | 6/2017 | Cook et al. |
| 2007/0285280 | A1 | 12/2007 | Robinson et al. |
| 2008/0194270 | A1 * | 8/2008 | Greenberg ............. G06F 16/29 455/456.1 |
| 2011/0115612 | A1 * | 5/2011 | Kulinets ............ H04N 5/23299 340/10.42 |
| 2012/0169516 | A1 | 7/2012 | Turnock et al. |
| 2012/0215594 | A1 | 8/2012 | Gravelle |
| 2012/0287278 | A1 | 11/2012 | Danis |
| 2014/0355837 | A1 | 12/2014 | Hedley et al. |
| 2015/0036881 | A1 * | 2/2015 | Sharma ................... G06F 16/50 382/103 |
| 2016/0224776 | A1 * | 8/2016 | Leow ..................... G06F 21/32 |
| 2017/0061719 | A1 | 3/2017 | Ruiters |

OTHER PUBLICATIONS

GeoToll, URL: http://geotoll.com/, Retrieved on Sep. 13, 2017, 1 page.

"Pay Tallo—The Mobile App to Pay for Toll Roads", URL: http://www.paytollo.com/ Retrieved on Sep. 13, 2017, 4 pages.

\* cited by examiner

500

| Location | Time | Vehicle | Device | | |
|---|---|---|---|---|---|
| 950 | 10/05/2017 8:00AM | Car A  Car X<br>Car D<br>Car E   Car G | Device 01 | Device 07 | Device 29 |
|  |  |  | Device 21 | Device 38 | Device 76 |
| 675 | 10/06/2017 8:05AM | Car C  Car X<br>Car Q<br>Car F   Car M | Device 32 | Device 07 | Device 98 |
|  |  |  | Device 56 | Device 45 | Device 76 |
| 270 | 10/07/2017 7:57AM | Car N  Car X<br>Car E<br>Car Y   Car P | Device 35 | Device 07 | Device 88 |
|  |  |  | Device 21 | Device 55 | Device 76 |
| 333 | 10/08/2017 8:10AM | Car L  Car X<br>Car J<br>Car T   Car K | Device 37 | Device 07 | Device 95 |
|  |  |  | Device 17 | Device 65 | Device 76 |

FIG. 5

CONTAINER FOR VAX POTTOR

| Vax Pottor: [Address, [Phone Number, etc.] | Car: [Make, Model, Color, License, etc.] | Van: [Make, Model, Color, License, etc.] |
|---|---|---|
| Cell Phone: [Cell Phone ID, Cell Phone #, etc.] | Cell Phone: [Cell Phone ID, Cell Phone #, etc.] | Device: [Device ID, etc.] |
| Device: [RFID #, etc.] | Device: [Device ID, etc.] | User: Cindy Pottor [Cindy's Info] |
| Apparel: [Type of Apparel, Label, Color, etc.] | Bicycle: [Make, Model, Color, Type, etc.] | Apparel: [Type of Apparel, Label, Color, etc.] |

FIG. 7

IDENTIFICATION USING MOBILE DEVICE SIGNATURES AND CAMERAS

RELATED APPLICATION

The subject patent application is a continuation of, and claims priority to, U.S. patent application Ser. No. 15/828,707, filed Dec. 1, 2017, and entitled "IDENTIFICATION USING MOBILE DEVICE SIGNATURES AND CAMERAS," the entirety of which application is hereby incorporated by reference herein.

TECHNICAL FIELD

The present application relates generally to the field of data processing and more specifically to using images of physical objects captured at locations, as well as signals comprising device signatures, to associate the physical objects with mobile devices and users.

BACKGROUND

Communications devices, such as mobile phones, smart watches, laptops, cars with OnStar, Wi-Fi cameras, RFID cards, etc. are ubiquitous. Each person may carry one or more devices that have some kind of digital mobile signature (e.g., identifier), be it cellular in nature, Bluetooth, Wi-Fi, or RFID. Some of these digital signatures usually can be used to identify an individual, and sometimes can at least be used to identify the device. Even though the devices may change through time, each of the devices carried by an individual usually has a distinguishable signature from another individual or another device, and individuals can carry each of such devices for several years. Public image capturing devices have also become more and more ubiquitous, whether they are storefront security cameras, traffic cameras, tollbooth cameras, or other cameras placed in a variety to locations to monitor events and persons. The ubiquitous nature of cameras and receivers that can receive signals from communications devices can present opportunities to gather and correlate information.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 is a chart illustrating an example container (e.g., database, record) illustrating the association of communications devices with vehicles in accordance with various aspects and embodiments of the subject disclosure.

FIG. 7 is a diagram illustrating an example a container for a user identity in accordance with various aspects and embodiments of the subject disclosure.

DETAILED DESCRIPTION

Figure 1:
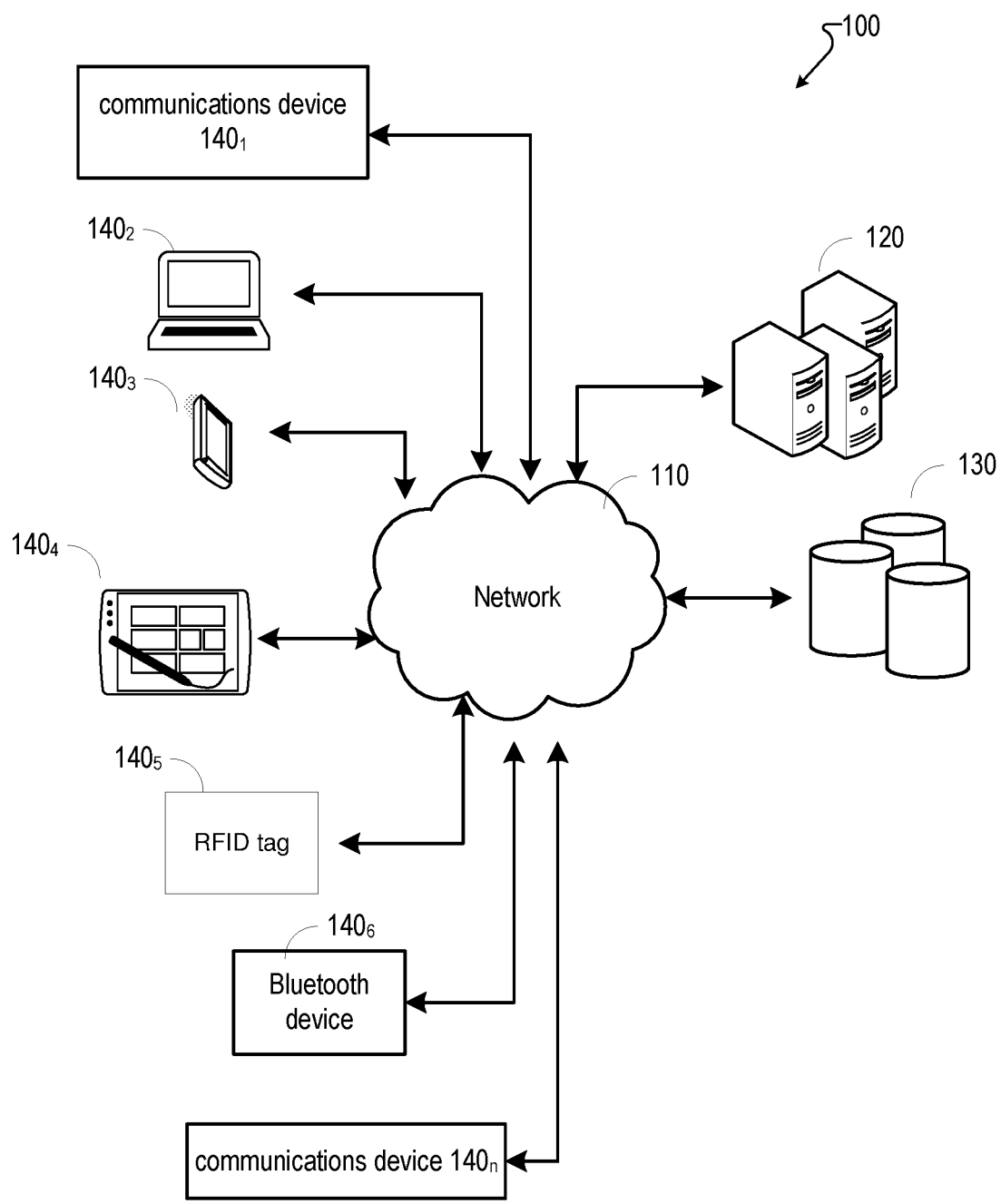
FIG. 1 is a diagram illustrating an example system and networking environment.

The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide an understanding of the subject disclosure. It may be evident, however, that the subject disclosure can be practiced without these specific details. In other instances, well-known structures and devices are shown in block diagram form in order to facilitate describing the subject disclosure.

The subject disclosure of the present application describes systems and methods, and example embodiments are described below with reference to block diagrams and flowchart illustrations of methods, functions, apparatuses, and computer program products and modules. Steps of the block diagrams and flowchart illustrations support combinations of mechanisms for performing the specified functions, combinations of steps for performing the specified functions, and program instructions for performing the specified functions. Example embodiments may take the form of web, mobile, wearable computer-implemented, computer software. It should be understood that each step of the block diagrams and flowchart illustrations, combinations of steps in the block diagrams and flowchart illustrations, or any operations, functions, methods, and processes described herein, can be implemented by computer processing systems comprising devices having processors and memories that store executable instructions (e.g., computer program product, computer-readable instructions, software, software programs, software applications, etc.) that, when executed by the processors, facilitate performance of those operations, functions, methods, and processes.

The devices can comprise a general-purpose computer, special purpose computer, combinations of special purpose hardware and other hardware, or other programmable data processing apparatus. Examples of such devices can be as described in FIG. 1, and can comprise circuitry and components as described in FIG. 12 and FIG. 13. The memories can comprise any suitable computer-readable storage medium, including, for example, hard disks, compact disks, DVDs, optical data stores, and/or magnetic data stores. Example embodiments may take the form of entirely hardware embodiments, entirely software embodiments, and embodiments combining both software and hardware aspects.

The present application describes systems and methods for utilizing a mesh of existing infrastructures to accurately identify users, and associate the user (and, in example embodiments, the user's communications devices) with physical objects (e.g., transportation vehicles, apparel, etc.). The infrastructures comprise the RFID readers (e.g., along toll lanes, doorways, etc.), traffic cameras (e.g., cameras on roads at intersections, storefront security cameras, etc.), cellular networks that allow devices to interact, Wi-Fi networks, and any potential future network/client system in which communications devices emanate signals having signatures.

The present application can be operable to use an iterative process to capture data, analyze the captured data by combining it with previously analyzed data, produce a new set of refined analysis, and offer a user identification, communication device, and physical object associations (e.g., driver-vehicle pair identification) with a high confidence level.

In example embodiments, there is provided herein a system comprising one or more devices, the one or more devices comprising a processor and a memory that stores executable instructions (e.g., an identification, analysis, and association IAA system) that, when executed by the processor, facilitate performance of operations. The operations can comprise receiving image data representative of images of a physical object captured at locations, receiving signal data representative of a signal from a mobile communications device at the locations. The operations can also comprise, based on time data and location data associated with the image data and the signal data, determining whether the physical object is correlated to the communications device and the user identity. Through an iterative process, a container (e.g., electronic record) in which data representative of the physical object, user identities, and communications devices can be stored.

FIG. 1 is a diagram illustrating an example of an environment 100 in which communications devices belonging to an individual can access computer networks, including services and functions provided through one or more computers attached to the network, including server devices having access to one or more data stores.

According to example embodiments, a system 100 in accordance with the present application can comprise one or more servers and communications devices that execute software modules (as described above) that can facilitate various functions, methods, and processes. As may be understood from this figure, the system 100 can comprise one or more computer networks 110, one or more servers 120, one or more data stores 130 (which may contain one or more databases of information), and one or more communications devices $140_{1-n}$ (also referred to as simply as communications device 140, or communications devices 140). Communications device 140 can comprise, for example, a laptop computer $140_2$, a mobile phone $140_3$ (which can be a smartphone), a tablet computer $140_4$, an RFID device $140_5$ (e.g., RFID tag, RFID chip, etc.), a Bluetooth device $140_6$, a wearable computing device, a virtual reality (VR) device, a heads-up display (HUD) device, an "internet of things" (IoT) device, and the like. Communications device 140 can be operable to communicate using one or more communications methods. For example, a communications device 140 can be cellular enabled (e.g., comprising a broadband adapter), Wi-Fi enabled (e.g., comprising a Wi-Fi adapter), Bluetooth enabled, RFID enabled, etc. In example embodiments, executable instructions that, when executed by a processor of the communications device 140, facilitate performance of operations, can be stored on one or more memory devices (e.g., memories) of the communications device 140 (or a memory device connected to the communications device 140).

In example embodiments, a communications device 140 can communicate via one or more communications networks (e.g., network 110), with one or more servers (e.g., servers 120) or other computing devices. In example embodiments, modules comprising executable instructions that, when executed by a processor of the server 120, facilitate performance of operations, can be stored on a memory device of the server 120 (or a memory device connected to the server).

In some embodiments, communications devices 140 running a webpage can access and communicate with servers 120 that are web-operable. These servers 120 can also be operable to send executable code capable of generating graphical user interfaces (GUIs) that a user identity can interact with to facilitate the provision of such on-line products and services.

The one or more computer networks 110 may include any of a variety of types of wired or wireless computer networks such as the Internet, a private intranet, a public switched telephone network (PSTN), cellular network, satellite network, data over cable network (e.g., operating under one or more data over cable service interface specification "DOCSIS"), or any other type of computer or communications network. The communications networks can also comprise, for example, a Local Area Network (LAN), such as an office or Wi-Fi network. The communications network can also comprise, for example, a Bluetooth network that allows one communications device 140 to be connected to other communications devices via the Bluetooth network. The communications network can also comprise an RFID network that can receive RFID signals from active and passive RFID devices.

Servers 120, data stores 130, and communications device 140, may be physically located in (or in the case of mobile devices, can be temporarily present in) a central location, or in separate facilities. The data stores can comprise physical media housed within the one or more servers 120, or connected to the servers 120 through one or more networks. In example embodiments, the one or more computer networks 110 facilitate communication between the server(s) 120, data store(s) 130, and communications device 140.

Figure 2:
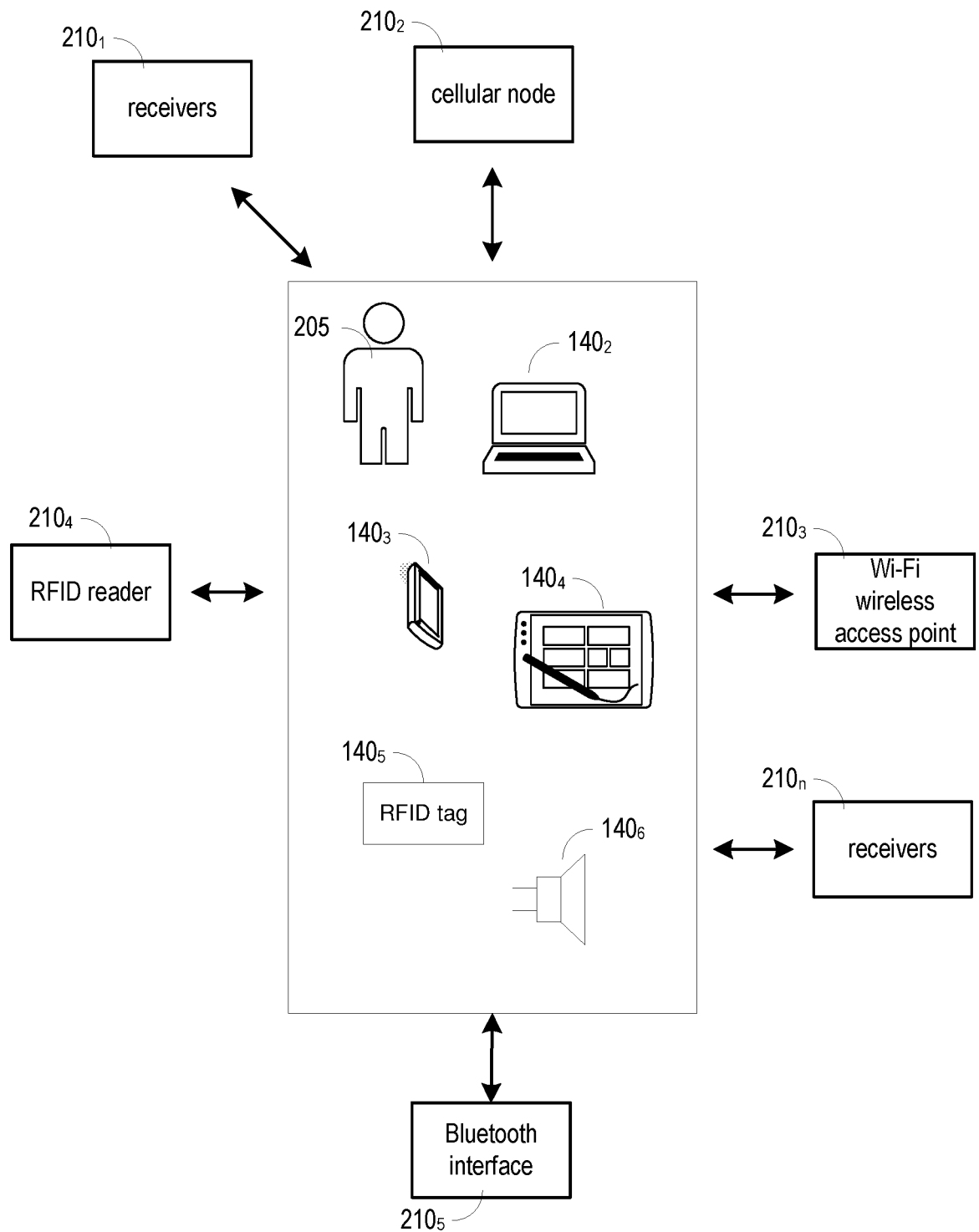
FIG. 2 is a diagram illustrating an example system and networking environment in which a user identity's associated communications devices communicate with receivers.

FIG. 2 is an example further illustrating aspects of the components illustrated in FIG. 1. A user identity 205 may carry on his person (or in his transportation vehicle) a variety of communications devices 140, each of which can transmit signals to receiver(s) (e.g., sensors, receiving devices, etc.) $210_{1-n}$ (also referred to as receiver 210, or receivers 210). Examples of receivers 210 can comprise cellular nodes (e.g., cellular node $210_2$, Wi-Fi wireless access points (e.g., wireless access point $210_3$), RFID readers (e.g., RFID reader $210_4$), Bluetooth interface (e.g., Bluetooth interface $210_5$). For example, the user identity 205 may carry a laptop computer $140_2$ that might be cellular-enabled. As such, the laptop can be operable to communicate with one or more cellular network nodes $210_2$. The laptop can also be a Wi-Fi enabled laptop, and as such, can be operable to communicate via a Wi-Fi wireless access point $210_3$.

The user identity 205 might carry a mobile phone $140_3$ (which can be a smartphone). The smartphone $140_3$ can be operable to communicate with one or more cellular network nodes (e.g., cellular node $210_2$). The smartphone $104_3$ can also be a Wi-Fi enabled device, and as such, can be operable to communicate via a Wi-Fi wireless access point (e.g., Wi-Fi wireless access point $210_3$).

The user identity 205 might carry a tablet computer $140_4$. The tablet $140_4$ can be cellular enabled, allowing it to communicate with one or more cellular network nodes (e.g., cellular node $210_2$). The tablet can also be Wi-Fi enabled, allowing it to communicate via a Wi-Fi wireless access point (e.g., Wi-Fi wireless access point $210_3$).

The user identity 205 might carry a communication device 140 that is an RFID device $140_5$ (e.g., RFID tag, RFID chip, etc.), which can send active RFID or passive RFID signals to, for example, an RFID reader (e.g., RFID reader $210_4$). Typically, an RFID device can send a signal to an RFID reader, allowing a user identity to access a particular location, or in other cases, carry out a transaction (e.g., a tollbooth transaction).

The user identity 205 might carry a communication device 140 that is a Bluetooth device $140_6$. The Bluetooth device (e.g., a Bluetooth speaker) can be operable to pair with other devices (including other communications devices 140) through a Bluetooth network connection.

As mentioned, these devices can be carried on a user identity's person, or can be carried in some mode of transportation associated with the user identity (e.g., a car, a van, a bus, a bicycle, a motorcycle, etc.). Additionally, other user identities can carry such communications devices in the same mode of transportation as used by the user identity 205 (e.g., carpooling in the same vehicle, riding the same bus, etc.).

Figure 3:
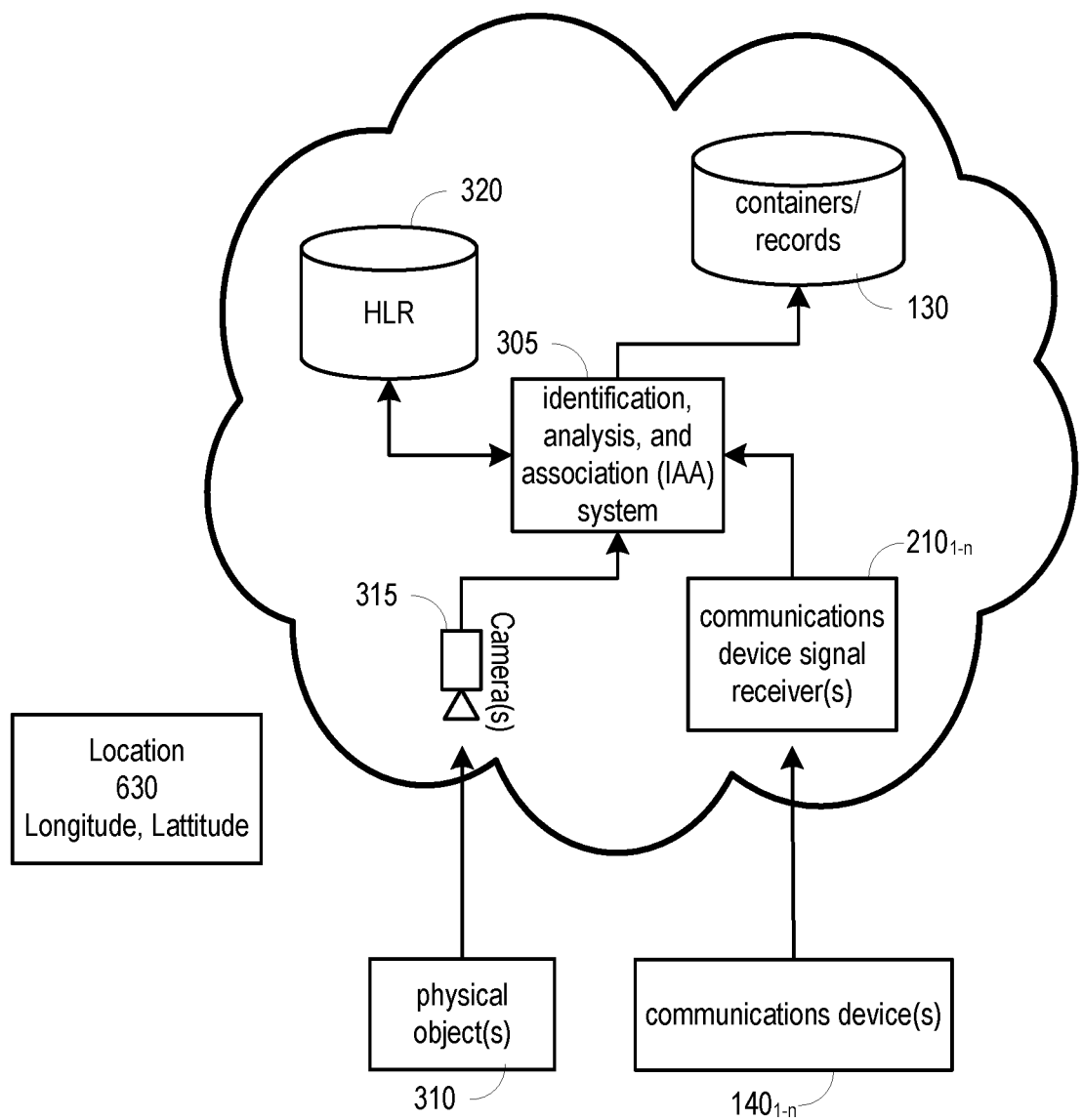
FIG. 3 is a diagram illustrating an example identification analysis and association system in accordance with various aspects and embodiments of the subject disclosure.

FIG. 3 depicts a diagram 300 showing an example embodiment of the present application in which an identification analysis and association (IAA) module 305 (which, as mentioned above, can be implemented as software, hardware, or some combination thereof) is operable for creating a container (e.g., record) in which a physical object(s) 310 can be associated with one or more communications devices $140_{1-n}$, as well as other physical objects, of the user identity 205 (e.g., possessed, carried, or operated by the user identity 205).

In example embodiments, one or more cameras 315 can capture an image of a physical object(s) 310 (e.g., a car, a vehicle, a bicycle, a clothing or apparel item, a person) at a particular location (e.g., a traffic intersection, a tollbooth, a storefront).

At or near the same point in time, at the particular location, signals from one or more communications devices 140 (e.g., a laptop computer $140_2$, a mobile phone $140_3$, a tablet computer $140_4$, an RFID device $140_5$, a Bluetooth device $140_6$) can be received by one or more receivers 210, as described above with respect to FIG. 2.

At other locations, the same process can be repeated, in which images of physical objects are captured at a particular time, and in which signals from communications devices 140 are received by receivers 210, also at a particular time.

While the camera images, as well as the received signals from the communications devices 140 can be used by their respective networks for various respective applications (e.g., a mobile phone can connect with another mobile phone, a signal from an RFID tag can be used to register a transaction, etc.), computing devices within those respective networks (not shown) can be programmed to be operable to send image data representative of the physical objects 310 captured by cameras at the locations, and also send signal data representative of the signals from the communications devices 140, to the IAA system 305. The signal data contain identifiers (e.g., a cell phone mobile identification number or MIN, a MAC address of the communications device, and RFID number, etc.) that can be used to identify the signal as originating from each communications device.

The IAA system 305 can be operable to receive image data representative of images of a physical object captured at locations, along with time data (e.g., time stamps) and location information (e.g., crossroads, addresses, or coordinates, such as longitude and latitude). The physical object can have one or more identifiable characteristics (in the case of a motor vehicle, such information as the license number, the make and model of the vehicle, the color of the vehicle, etc.).

The IAA system 305 can also be operable to receive signal data representative of a signal from one or more communications device at the locations.

The IAA system 305 can place collected image data representative of physical objects and signal data in a "container" for analysis, where the container can comprise, for example, numerous entries, records, including of the collected image data. The container can be stored in a repository accessible to the IAA system 305 (e.g., repository 130).

Because the image data and the signal data are collected at various times and locations (and these time stamps and location data can also be transmitted along with the image data and signal data), the analysis can comprise an iterative process in which, based on time data and location data associated with the image data and the signal data, the IAA system 305 can determine whether a physical object 310 is correlated to one or more communications devices 140.

As an example, in a first instance, an image of many physical objects 310, each having physical characteristics, can be captured by a camera (e.g., camera 315) at a particular location at a particular time. The image data can comprise a data element (e.g., marker, tag) that indicates the location of the camera. Likewise, at the same location (e.g., within range of the camera location), many signals, each having device identifiers, from a plurality of communications devices (e.g., communications devices 140) can be received at the same (or nearly the same) time by receivers 210. Signal data representative of a signal from the communications devices can be sent to the IAA system 305. The information sent to the IAA system 305 can also comprise a data element (e.g., marker, tag) that indicates the location that each device's device was received when the signal was received. Because many physical objects 310 and many signals were collected at this location and this time, it may not be determinable in this first instance as to which physical object 310 is associated with which communications device 140. In another point in time, a second instance (or iteration), more images of physical objects 310 and signal data from communications devices 140 can be collected at either the same location or another location. In this second instance, not all the same physical objects 310, or all the same signals as from the first instance are present. After multiple instances, an analysis of the data by the IAA system 305 might reveal that every time a particular physical object is present (e.g., a particular car) determinable from the physical characteristics of the object, a signal from a particular communications device (determined based on identifiers in the signal data associated with the device, such as a device signature) is also received at the same time and same location, or at substantially the same time and substantially the same location. The IAA system 305 can, based on this analysis, create a record for the particular physical object and associate it with that particular communications device.

Additionally, some of the identifiers (e.g., device signature) that can lead to the identification of the user of the communications device. For example, this identifier might be an international mobile equipment identifier (IMEI), or electronic serial number (ESN). Based on the identifier number, the IAA system 305 can be operable to access a mobile phone carrier's subscriber or billing information (e.g., information stored in a home location register (HLR), e.g., HLR 320). In this scenario, not only can a communications device 140 be associated with a physical object 310, but the identification of the user (e.g., by name, phone number, billing address) can also be associated with the physical object 310, as well as any other communications devices 140 and objects associated with the record for the physical object.

The IAA system 305 can, based on the analysis, create a record for the particular physical object and associate it with a particular communications device or a particular identified user. For example, a record (or container) for a particular public transit bus can show each of the communications devices associated with the bus, and to the extent determinable, the identities of the users that travel on that bus regularly. Additionally, the IAA system 305 can create a record for a particular user, wherein the record shows all the physical objects 310 (e.g., bus, car, picture, bicycle, clothing and apparel, etc.) and all the communications devices 140 (e.g., mobile phone, tablet, etc.) associated with the particular user.

In some example embodiments, various views can be presented to a viewer of the record. For example, a physical object view can be presented when a user viewing the record selects a particular physical object (e.g., selects a minivan). The view can present a listing of all users and communications devices associated with the physical object. A user view can be presented showing all physical objects and all communications devices associated with a particular user (as well as other users associated with the user).

Various examples and use cases below further describe determinations made through this iterative process, and use cases for the technology.

Figure 4:
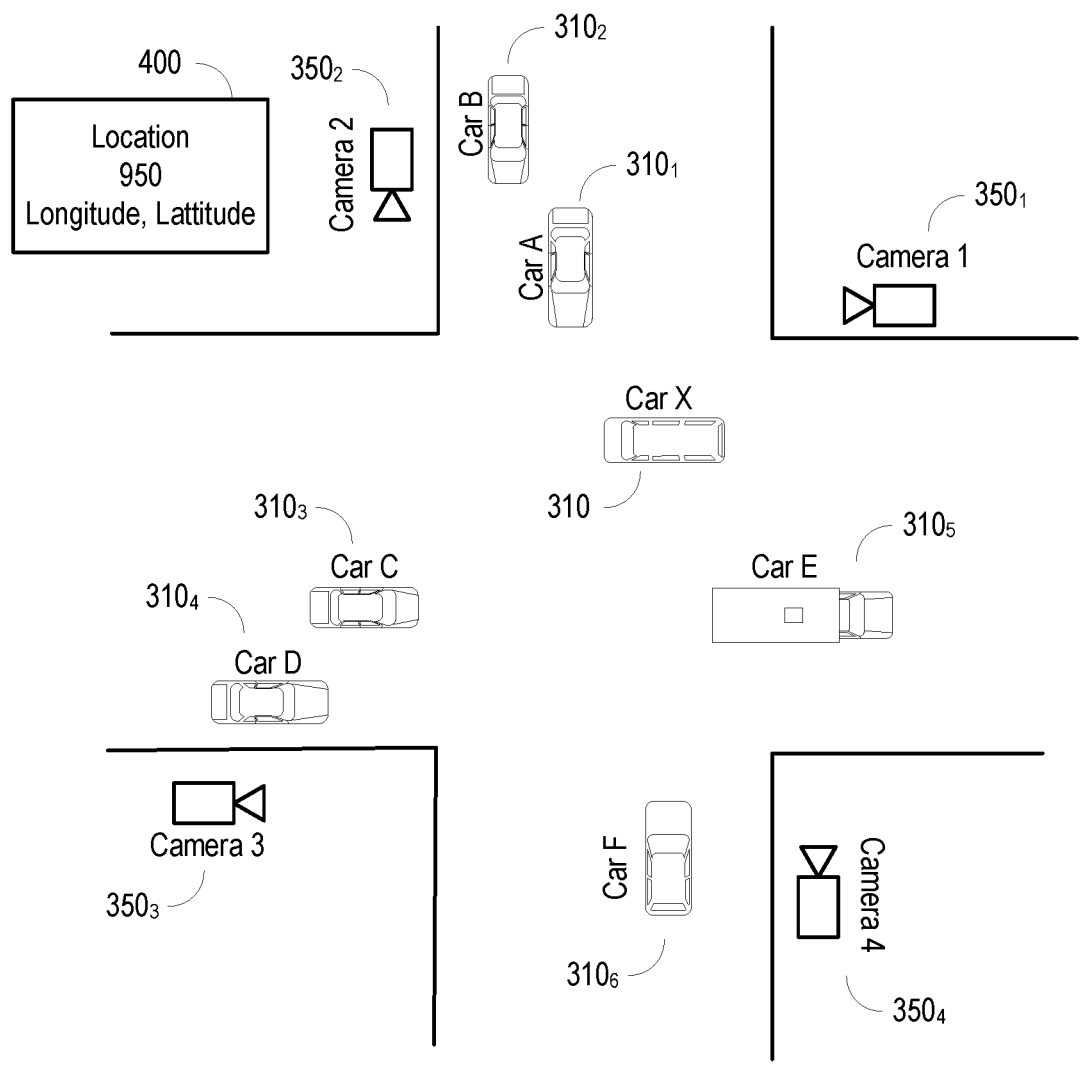
FIG. 4 is a diagram illustrating an example traffic intersection having motor vehicles and communications devices.

FIGS. 4-5 illustrate a process that can be performed by the IAA system. In these procedures, and use case described below, a driver of a vehicle can be more accurately identified. Here, the example of physical objects 310 comprises motor vehicles. (e.g., cars, vans, trucks, buses) at a traffic intersection.

Existing systems used to identify drivers for traffic infractions or toll collection rely mainly on cameras, RFID tags, or radar with an observer. Typical tolling systems and red-light traffic cameras rely heavily on capturing by camera a vehicle's license plate (which can serve as a way to uniquely identify the vehicle), and/or by using RFID tags placed inside an RFID device in the vehicle (e.g., mounted on the windshield). This system is adequate for drivers who actively enroll with RFID tags (e.g., submit identity information and payment information) and who are the legitimate drivers of the registered vehicles. Such systems target the identification of the vehicle (for example, if a different driver from the enrolled driver is operating the vehicle) without any specific knowledge of the driver. Usually it's the owner of the vehicle (or a family member of the owner) that causes the traffic infraction or uses the toll lane. However, there are many drivers who do not enroll with RFID tags, or they may drive someone else's car (e.g., thus avoiding the payment of tolls or fines, at least temporarily), such as in the case of a rental vehicle, or borrowing a friend or neighbor's vehicle. A communications device 140 can be traveling inside a vehicle, whether the device is on a person or somewhere else in the vehicle. Through an iterative process, the IAA system 305 can trace a device to a particular vehicle, then the system can make a determination of who is inside a specific vehicle (e.g., so that the driver responsible for the infraction or toll can be identified).

In FIG. 4, cameras 350 (e.g., camera 1, 2, 3, and 4) at a traffic intersection may capture the images of all cars at the location 400 ("location 950"), including cars A, B, C, D, E, F, and X. The devices in this location may be all of the communications devices in these vehicles, and some pedestrian devices, or devices in the nearby buildings. Throughout the day, the same cameras 350 will capture images of different vehicles passing through this intersection, or no vehicle at all. The set of devices captured for processing during each sample may reveal devices 140 that are always present even when there are no vehicles around. Those devices can be eliminated from the virtual containers as noise. Assuming that Car X drives through this intersection daily or even frequently, then the digital mobile signature for a communications device inside Car X. Communications devices can be on a person in a vehicle (e.g., in the driver's pocket), or just somewhere inside the vehicle (e.g., on a cellphone holder mounted on the dashboard or in an air vent, in a backpack in the vehicle, on the passenger seat, in the trunk, etc.). The signal data from a communications device, which contains its signature, can be matched with every time Car X (for example) appears, because the digital mobile signature appears at the same time that an image of Car X is captured by a camera at the intersection.

In example embodiments, the IAA system 305 can be operable for creating a virtual container (e.g., database, collection, series of records, etc.) that stores image data representative of images of the vehicles captured by a camera at the intersection intersections. The image data can be sent by various camera systems that capture the images of physical objects 310. If the images have not been processed yet by the camera systems to determine the image data, the IAA system 305 can perform that function. The image data can comprise various information regarding each vehicle, to the extent determinable. This information can include the vehicle license plates, the vehicle makes, vehicle models, vehicle colors. The image data can also include, or have data appended to it that includes, the RFID of the vehicles (e.g., RFID signature), and the calculated speed of the vehicles. The images data can also comprise, or be appended with, time and location data, the location data representative of the location of the cameras where the images were captured. The location data can comprise, for example, an address, or coordinates (such as given by latitude and longitude).

Signals from communications devices 210 within the range of the location of the cameras at the intersection can also be received by various receivers 210. The signal data, which can also comprise time and location data (e.g., location of where the communications device 210 is) can also be sent by a system that is coupled to the signal receivers 210. For example, a cellular communications system, or GPS system, can be operable to send, either directly or indirectly, the location and time data on the devices that connect to those systems.

In some example embodiments, virtual containers can be created, wherein each virtual container corresponds to the data gathered from a particular location.

When image data, signal data, time and location data are all in the same container or database, an analysis of that database and the items in it can be performed by the IAA system 305. The IAA system 305 can be operable to eliminate repeating devices that are not associated with vehicles. This can be implemented by evaluating communication device signatures that are duplicated in multiple snapshots without any vehicle being repeated in those snapshots. The IAA system 305 can be operable to eliminate devices that are captured when there are no vehicles in the virtual container. These are negative samples taken when there are no vehicles detected on the roads.

FIG. 5 illustrates an example in which communications devices 140 can be determined to be associated with physical objects 310 that are vehicles. As shown in FIG. 5, a virtual container 500 (e.g., database) can contain the image data captured by one or more cameras 315. The image data can comprise various information about the vehicle, including its license plate. For simplicity, the identity of each vehicle is labeled by alphabet (e.g., Car A, Car B, etc.). Also included in the container is information gathered from the signals received from communications devices 140, which can comprise a device ID. For simplicity, device IDs are labeled numerically in FIG. 5. The container 500 can also contain location and time information, representing the times and locations that the images and signals were received. By way of illustration, the container 500 is represented as a chart, but can be represented in other fashions for representing databases and elements in databases. Also, for simplicity, in the example shown, a limited number of vehicles and devices are shown, and a limited number of sample times and locations are shown.

As shown in FIG. 5, at a location (e.g., location 950), the images of various vehicles (e.g., Car A, Car B, Car C, etc.) can be captured at various times, a few of which times are shown (e.g., 10/05/2017 8:00 AM, 10/06/2017 8:05 AM). As illustrated, in the first instance (e.g., sampling, iteration, etc.) at location 95 at 10/05/2017 8:00 AM, five motor vehicles were detected—Car A, Car X, Car D, Car E, Car G. Additionally, six devices were detected—Device 01, Device 07, Device 29, Device 21, Device 38, Device 76. In the first instance, it is indeterminable which devices are associated with which vehicles. But after more instances, it can be seen that each time Car X is present, so is Device 07 and Device 76. Thus, Device 07 and Device 76 can be associated with Car X.

If a user can be identified for Device 76, for example, it then the device 07 can also be associated with the user. Thus, Device 76 might be, for example, a cellular phone, while Device 07 might be, for example a tablet. Device 76, as a cellular phone, would have associated with its signal data an identifier or device signature (as mentioned above, and IMEI or ESN) that would allow the IAA system 305 use to query a mobile phone carrier's subscriber or billing information (e.g., information stored in a home location register (HLR), e.g., HLR 320). In this scenario, the identification of the user (e.g., by name, phone number, billing address) can be associated with the Device 76, the vehicle Car X, and Device 07 as well.

Figure 6:
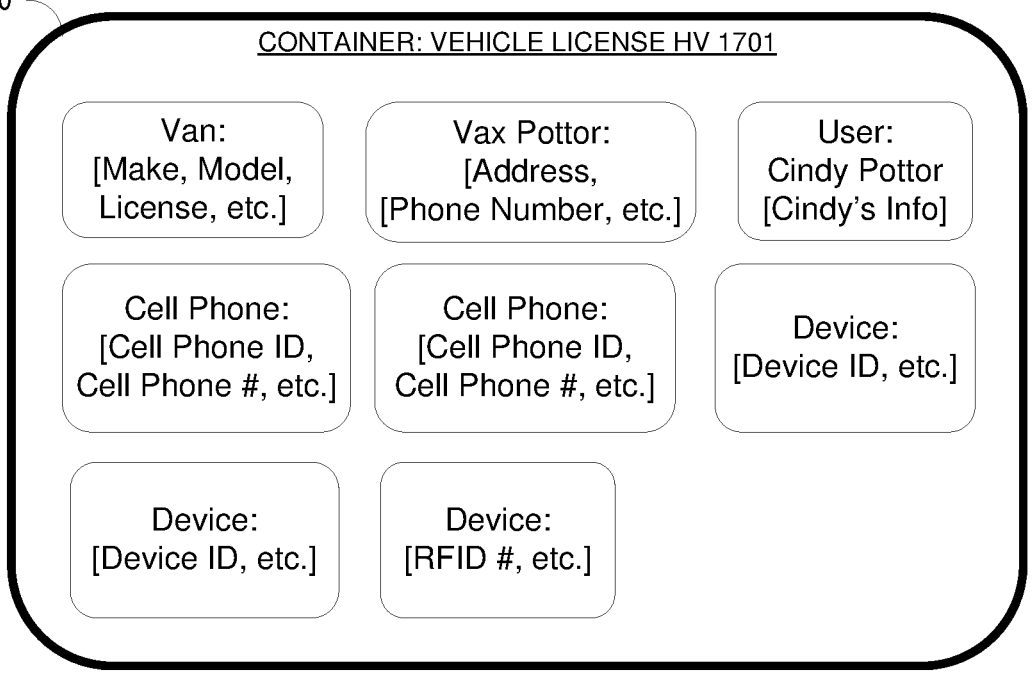
FIG. 6 is a diagram illustrating an example container for a physical object (e.g., motor vehicle) in accordance with various aspects and embodiments of the subject disclosure.

Moving to FIG. 6, in example embodiments, the IAA system 305 can then create a record for each vehicle (e.g., a virtual container 600 for each vehicle, vehicle container). The record may also be thought of as viewing related and associated data from the perspective of the vehicle (or some other physical object 310). For each vehicle container, the IAA system 305 can, as described above, then identify a set of the communications devices 140 that are present at that time and location, and then repeat after multiple times (and/or multiple locations) until the communications devices 140 that are detected a substantial number of times with the vehicle are identified. That set of devices 140 may not be repeating in every single virtual container, but that set as a whole is highly identifiable as the devices belonging to the driver for this vehicle container. As the solution improves with machine learning (e.g., by the IAA system 305), the signals from a set of determined devices can be used as the digital mobile signature of the driver. As shown in FIG. 6, Car X, by analyzing the captured image from a camera, might have been identified as a minivan with license plate HV 1701. More information about the van might be part of the record (e.g., make, model, etc.). More communications devices 140 (e.g., smartphone, smartwatch, tablet, RFID badge, etc.) might have been associated (based on the iterative processed described above) with the vehicle container. Based on the device IDs associated with the vehicle, one or more users might have been identified (e.g., Vax Pottor, Cindy Pottor)).

Referring now to FIG. 7, in addition to creating a record, or virtual container, for a specific vehicle, the IAA system 305 can also be operable to create a record for a particular driver identity (e.g., user). It can also be operable to associate the devices that are found in the presence of the vehicles (e.g., based on time and location) into this driver's container. The list of these devices can be considered the digital mobile signature of the driver. If a subset of the list of these devices are present with a series of captured data showing a particular vehicle is present in the captured data, and the subset of the devices are also present, then the driver identified in this driver container is the candidate for the driver's identity Here, in FIG. 7, the virtual container 700 for Vax Pottor is shown. Through the iterative process as described above, various physical objects 310, communications devices 140, and users can be associated with Vax Pottor. In addition to a vehicle that is a motor vehicle, other physical objects 310 such as apparel and bicycles can be associated with a user. The process to identify these physical objects 310 can follow a similar iterative process to that of motor vehicles and devices inside the motor vehicles. For example, a storefront camera might capture an image of a Vax Pottor wearing a particular apparel (e.g., a blue-colored Polo-branded golf shirt) at several locations, while at the same time and location, the Vax's device's signal data is received. After several iterations (e.g., perhaps visiting 20 stores), a blue-colored Polo-branded golf shirt can be associated with Vax and part of his virtual container. As a use case, the next time Vax Pottor's mobile device signature is received at a particular storefront, a targeted ad for a Polo-branded golf shirt can be sent to Vax Pottor's phone, based on the fact that his virtual container has a Polo-branded shirt associated with it.

Figure 8:
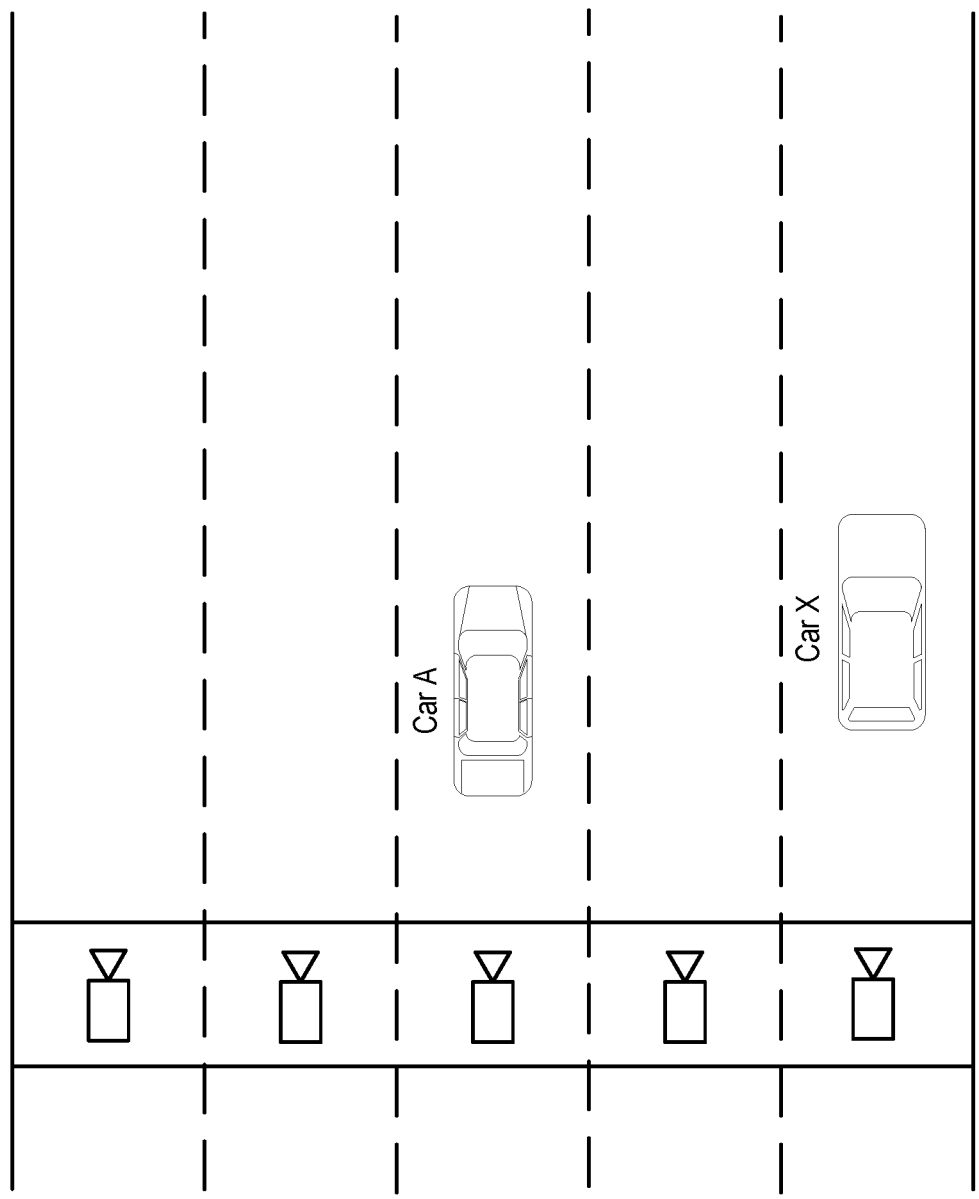
FIG. 8 is a diagram illustrating an example of a tollbooth wherein the driver of the vehicle can be identified as a result of associations made by an example identification analysis and association system in accordance with various aspects and embodiments of the subject disclosure.

FIG. 8 illustrates another example using toll lane cameras. When Car X, and Car A drive through the toll booth, the digital mobile signatures of any of their communications devices 140 should both show up in the captured data. Then when either car drives through the toll lane, it becomes clear which one belongs to Car X, and which one belongs to Car A, based on the signature that has been associated with each car (e.g., Car X had devices 07 and device 76, each of which produced a signature as it went through the toll area, assuming that receivers capable of picking up the signal data from those devices are present and installed). Thus, a group of devices can be used as digital signature for a specific driver. As the data changes, the set of devices can also change. The IAA system 305 can analyze the data and group the devices 140 and physical objects 310 with relevance. It doesn't require the user to actively register an RFID, or any other communications device. So even for devices without a license plate or an RFID, the system can identify who was present at a specific location, and at what time or speed.

In another use case, a missing person can be tracked using the system. In this scenario, assume that Vax Pottor has been kidnapped and placed in a motor vehicle K. If Vax has on his person a communication device (such as an RFID badge that is used to access his work location) that has become associated with Vax via the iterative processes, then the next several iterations that Vax's RFID tag emanates a signal with an RFID signature, it can be associated with a physical object, such as motor vehicle K. Or, it can be associated with an undisclosed location that can now be determined because once a communications signal from a communications device has been received, and the motor vehicle container shows that the communications device is associated with Vax. Then, authorities can determine from which location the communication signal originated.

In example embodiments, the IAA system 305 can take the form of a device (or one or more devices, which may be networked) that comprises a processor and a memory that stores executable instructions that, when executed by the processor, facilitate performance of operations, as described below.

The operations can comprise receiving image data representative of images of physical objects (e.g., motor vehicles, vehicles, clothing and apparel, accessories, etc.) captured (e.g., by a camera) at locations (e.g., traffic intersections, streets, toll lanes, stores, storefronts, other places having cameras, etc.), wherein the physical objects comprise identifiable features (e.g., a license plate number, brand logo, etc.).

The operations can further comprise receiving signal data representative of signals from communications devices (e.g., communications devices $140_{1-n}$), wherein the signals were received by receivers (e.g., receivers $210_{1-n}$) associated with the locations. The signal data can comprise device identifications (e.g., device IDs, device identifiers) that can be used to identify each of the communications devices.

The operations can further comprise, based on time data and location data (e.g., address, coordinates, etc.) associated with the image data and the signal data, determining whether one of the physical objects is correlated with one of the communications devices.

The operations can further comprise, in response to a determination that one of the physical objects is correlated to one of the communications devices (e.g., after multiple iterations, instances, etc.), storing record data (e.g., a container, database, etc.) comprising a first data element representative of the one of the physical objects and a second data element associated with the one of the communications devices.

The operations can further comprise using one of the device identifications that is associated with the one of the physical objects, determining a user identity associated with the one of the communications devices (e.g., by querying a customer billing database, subscriber location registry, home location register, etc.) and storing record data comprising a third data element (e.g., name, address, etc.) representative of the user identity.

Figure 9:
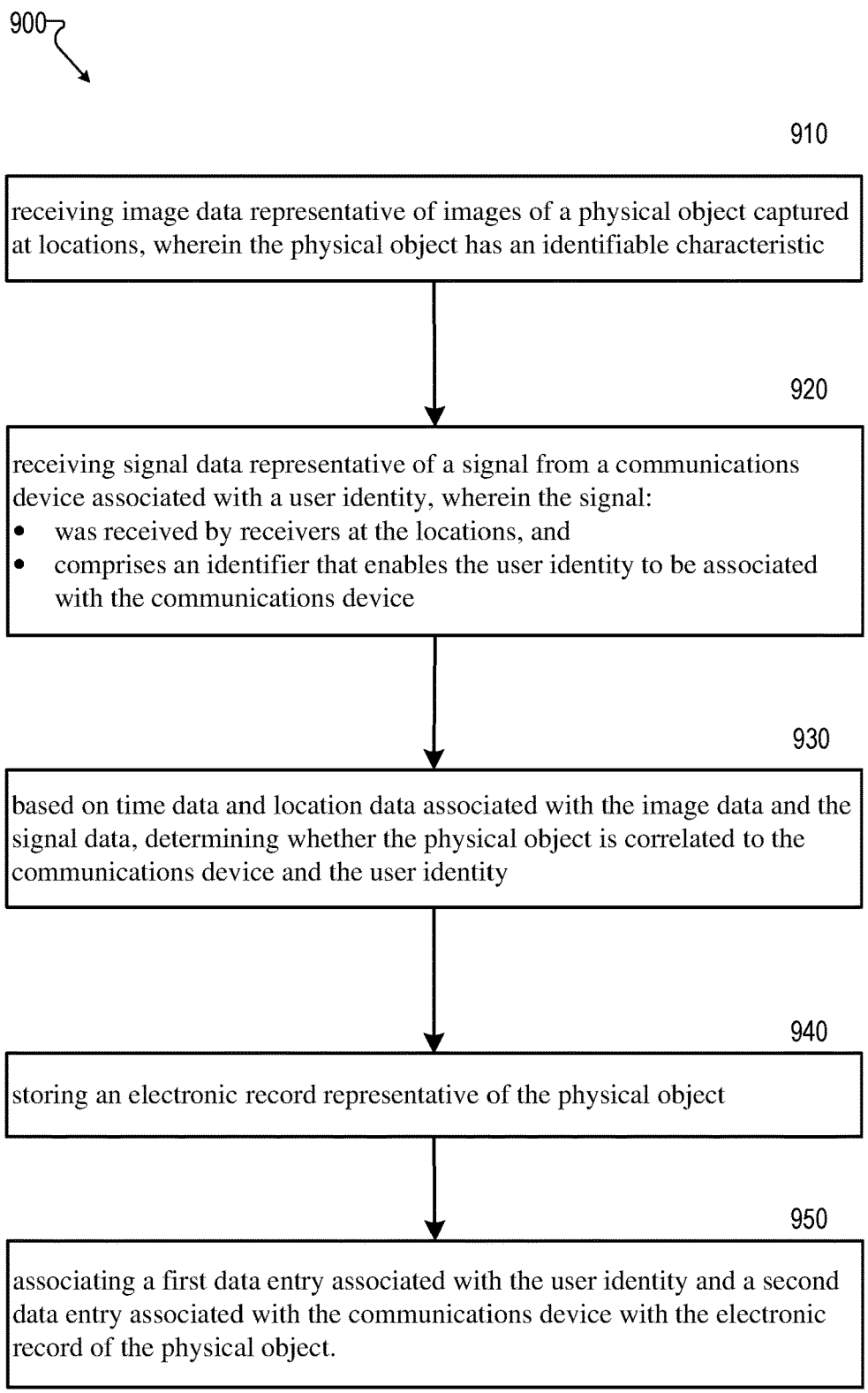
FIG. 9-11 illustrate example flow diagrams relating to operations that can be performed in accordance with various aspects and embodiments of the subject disclosure.

In non-limiting embodiments, a device (or system) is provided (e.g., IAA system 305) comprising a processor and a memory that stores executable instructions that, when executed by the processor, facilitate performance of operations as illustrated in flow diagram 900 of FIG. 9.

As shown at 910, the operations can comprise receiving image data representative of images of a physical object (e.g., motor vehicle, vehicle, clothing and apparel, accessory, etc.) captured at locations (e.g., traffic intersections, streets, toll lanes, stores, storefronts, other places having cameras, etc.), wherein the physical object has an identifiable characteristic (e.g., a license plate number, brand logo, etc.). The image data can be captured by a camera communicatively coupled to the device. The physical object can be, for example, a motor vehicle, and the identifiable characteristic can comprises a license plate number of the motor vehicle.

Still on FIG. 9, the operations can, as shown at step 920, further comprise receiving signal data representative of a signal from a communications device (e.g., communications devices 140), associated with a user identity, wherein the signal was received by receivers (e.g., receivers $210_{1-n}$) at the locations, and wherein the signal comprises an identifier (e.g., device ID, device identifier) that enables the user identity to be associated with the communications device. The identifier can enable the identity of the user identity to be determined based on a subscriber location registry.

As shown in FIG. 9 at 930, the operations can further comprise, based on time data and location data associated with the image data and the signal data, determining whether the physical object is correlated to the communications device and the user identity.

Also in FIG. 9 at 940, the operations can further comprise, storing an electronic record (e.g., a container, database, etc.) representative of the physical object.

At 950, the operations can further comprise associating a first data entry associated with the user identity and a second data entry associated with the communications device with the electronic record of the physical object.

The operations can further comprise, wherein the communications device is a first communications device, associating a third data entry associated with a second communications device with the electronic record representative of the physical object, and wherein the second communications device comprises signature data (e.g., RFID, Wi-Fi signature, device ID, etc.) that enables the second communications device to be identified.

The operations can further comprise using the electronic record to locate the user identity. This can involve, for example, receiving, at an undisclosed location, a communication signal from the communications device, wherein the communication signal comprises the identifier, and using the identifier and the electronic record, determining the undisclosed location.

The operations can further comprise sending a targeted message to the communications device based on the electronic record. Sending the targeted message can comprise sending the targeted message to the communications device in response to a camera capturing an image of the physical object. For example, if a storefront camera captures a motor vehicle associated with the user identity via the record, a targeted message (perhaps related to the store of the storefront camera) can be sent to the communications device associated with the record.

Figure 10:
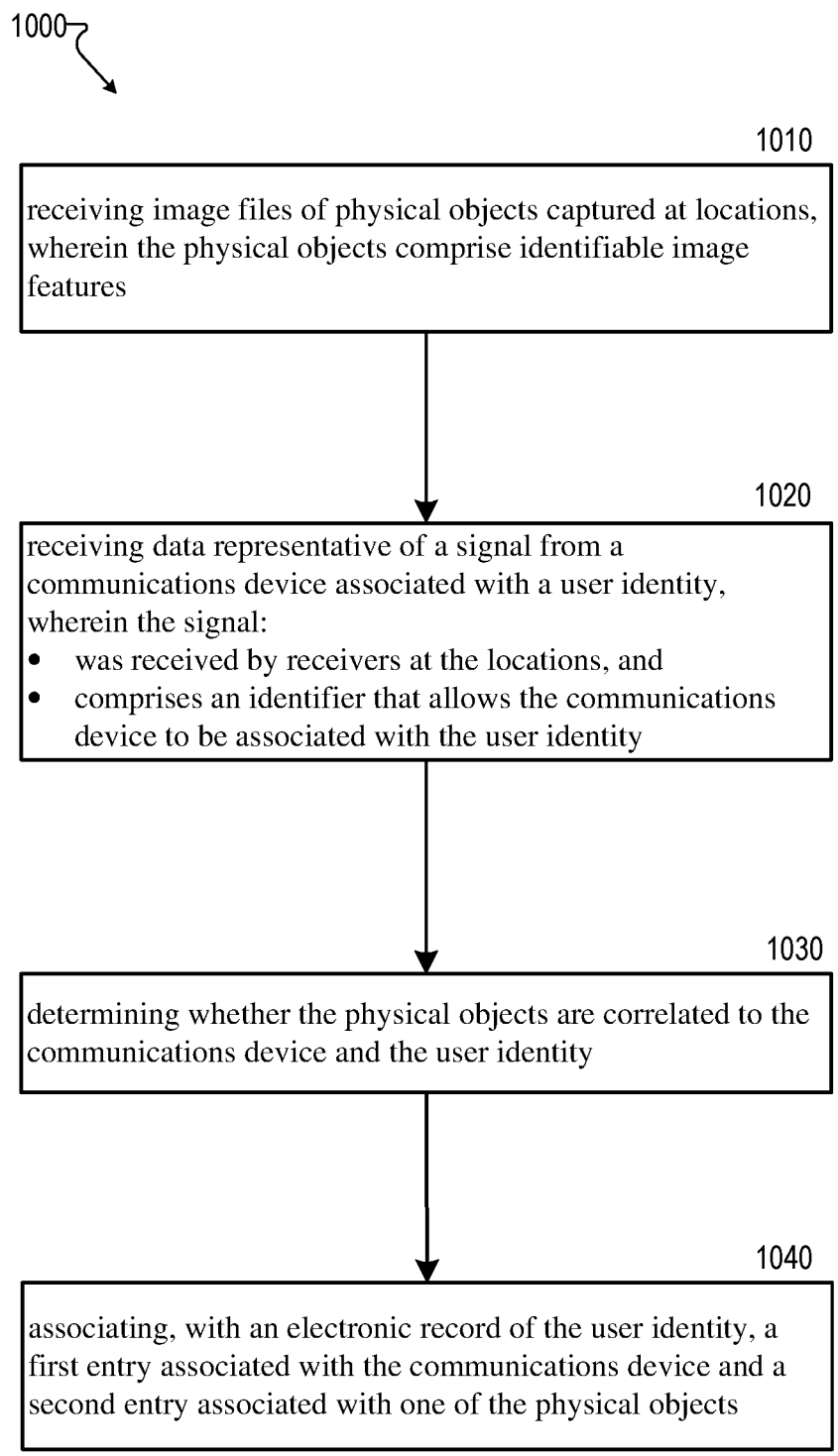

In another non-limiting embodiment, a device or system (e.g., IAA system 305) is provided, comprising a processor and a machine-readable storage medium (e.g., memory) that stores executable instructions that, when executed by the processor, facilitate performance of operations as illustrated in flow diagram 1000 of FIG. 10.

As shown at 1010, the operations can comprise receiving image files of physical objects captured at locations (e.g., a storefront camera in a shopping area), wherein the physical objects comprise identifiable image features. The physical objects can comprise, for example, an accessory carried by a person identified by the user identity (e.g., who can be the user identity), and the he identifiable image features comprise a label associated with the accessory. The physical objects can comprise an item of clothing worn by a person that is the user identity, and the identifiable image features comprise a style of the clothing.

In FIG. 10, at 1020, the operations can comprise receiving data representative of a signal from a communications device of a user identity, wherein the signal was received by receivers at the locations, and wherein he signal comprises an identifier that allows the communications device to be associated with the user identity.

As shown in 1030, the operations can comprise determining whether the physical objects are correlated to the communications device and the user identity.

At 1040, the operations can comprise associating, with an electronic record of the user identity, a first entry associated with the communications device and a second entry associated with one of the physical objects.

Figure 11:
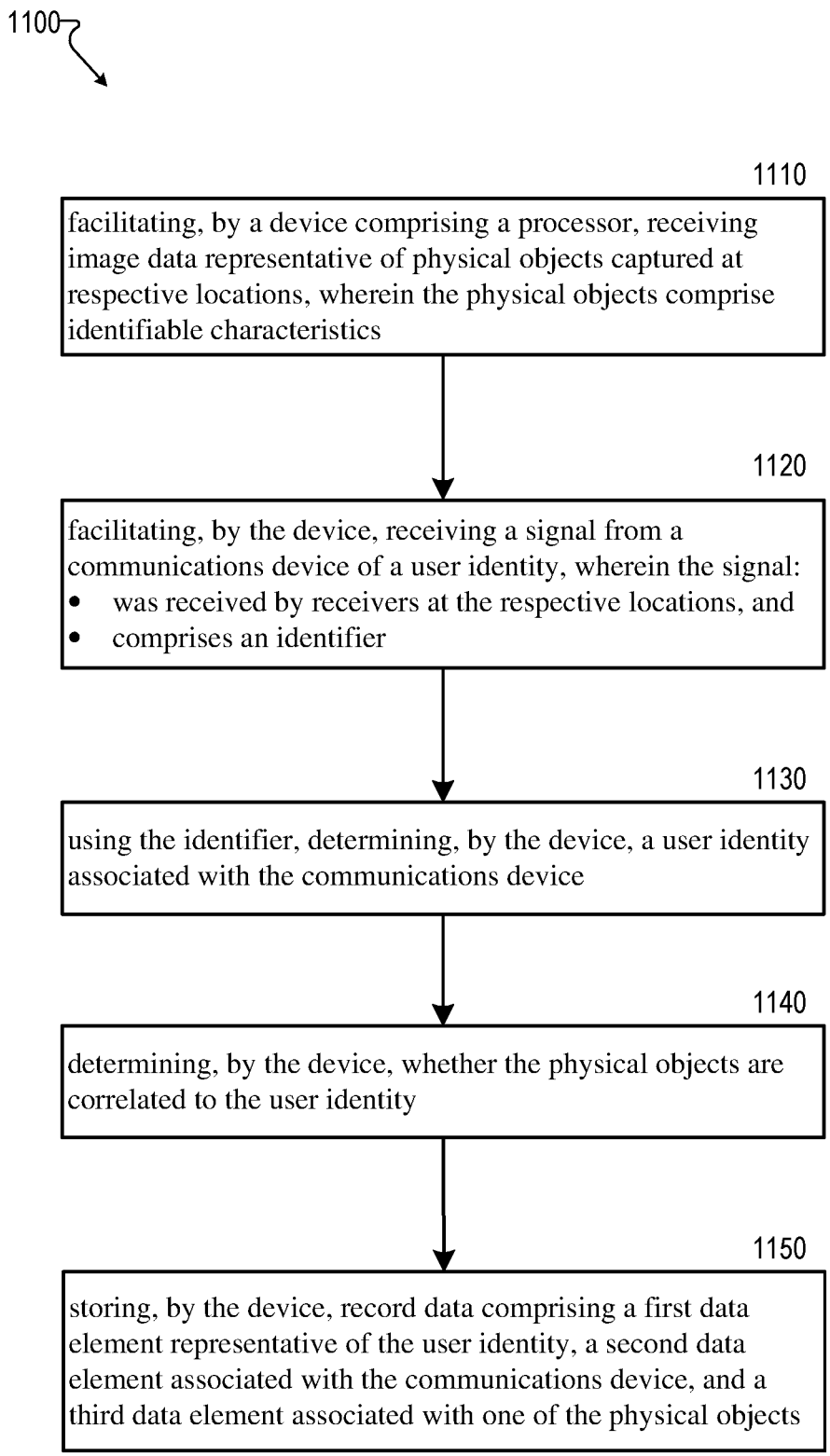

In non-limiting embodiments, a device or system (e.g., IAA system 305) is provided, comprising a processor and a memory that stores executable instructions that, when executed by the processor, facilitate performance of a method as illustrated in flow diagram 1100 of FIG. 11.

As shown at 1110, the method can comprise receiving image data representative of physical objects captured at respective locations, wherein the physical objects comprise identifiable characteristics.

The method at 1120 can further comprise receiving a signal from a communications device of a user identity, wherein the signal was received by receivers at the respective locations, and wherein he signal (e.g., Wi-Fi signal, cellular signal, RFID signal) comprises an identifier.

At 1130, the method can further comprise, using the identifier, determining a user identity associated with the communications device.

At 1140, the method can comprise determining whether the physical objects are correlated to the user identity.

The method can further comprise, at 1150, storing, by the device, record data comprising a first data element representative of the user identity, a second data element associated with the communications device, and a third data element associated with one of the physical objects.

The method can optionally comprise generating a user interface that renders object information representing the physical objects and the communications device associated with the record data.

Figure 12:
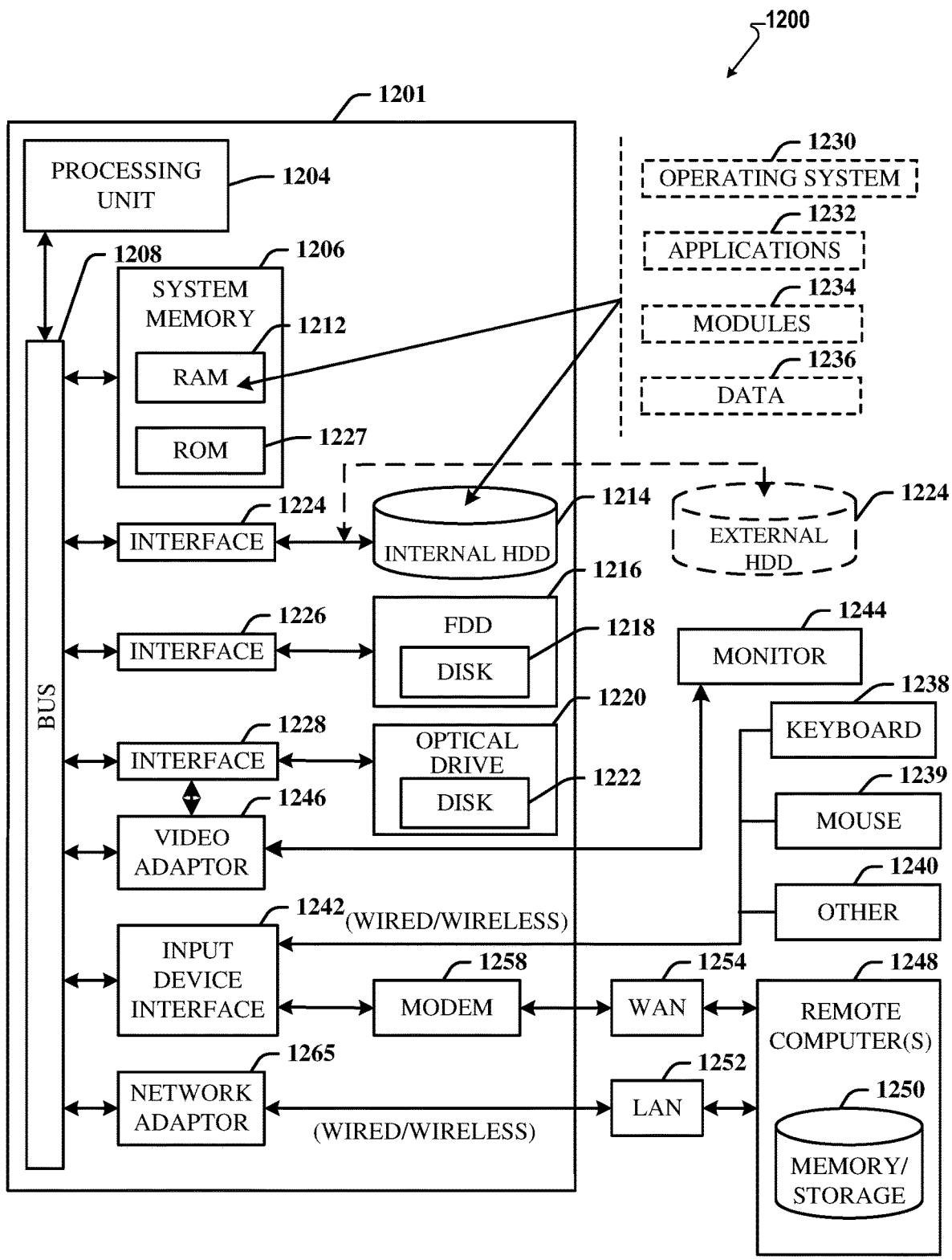
FIG. 12 illustrates an example block diagram of a computer that can be operable to execute processes and methods in accordance with various aspects and embodiments of the subject disclosure.

Referring now to FIG. 12, there is illustrated a block diagram of a computer 1200 operable to execute the functions and operations performed in the described example embodiments. For example, a user device (e.g., communications device 120) or servers (e.g., servers 120) can contain components as described in FIG. 12. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory data stores.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein are devices that can comprise a computer 1200, the computer 1200 comprising a processing unit 1204, a system memory 1206 and a system bus 1208. The system bus 1208 couples system components comprising the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further comprises an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1239. Other input devices 1240 (not shown) can include a microphone, camera, an IR remote control, a joystick, a game pad, a stylus pen, touch screen, biometric reader (e.g., fingerprint reader, retinal scanner, iris scanner, hand geometry reader, etc.), or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device can also be connected to the system bus 1208 through an interface, such as a video adapter 1246. In addition to the monitor 1244, a computer 1200 typically comprises other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically comprises many or all of the elements described relative to the computer, although, for purposes of brevity, only a memory/data store 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1200 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/data store 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 13:
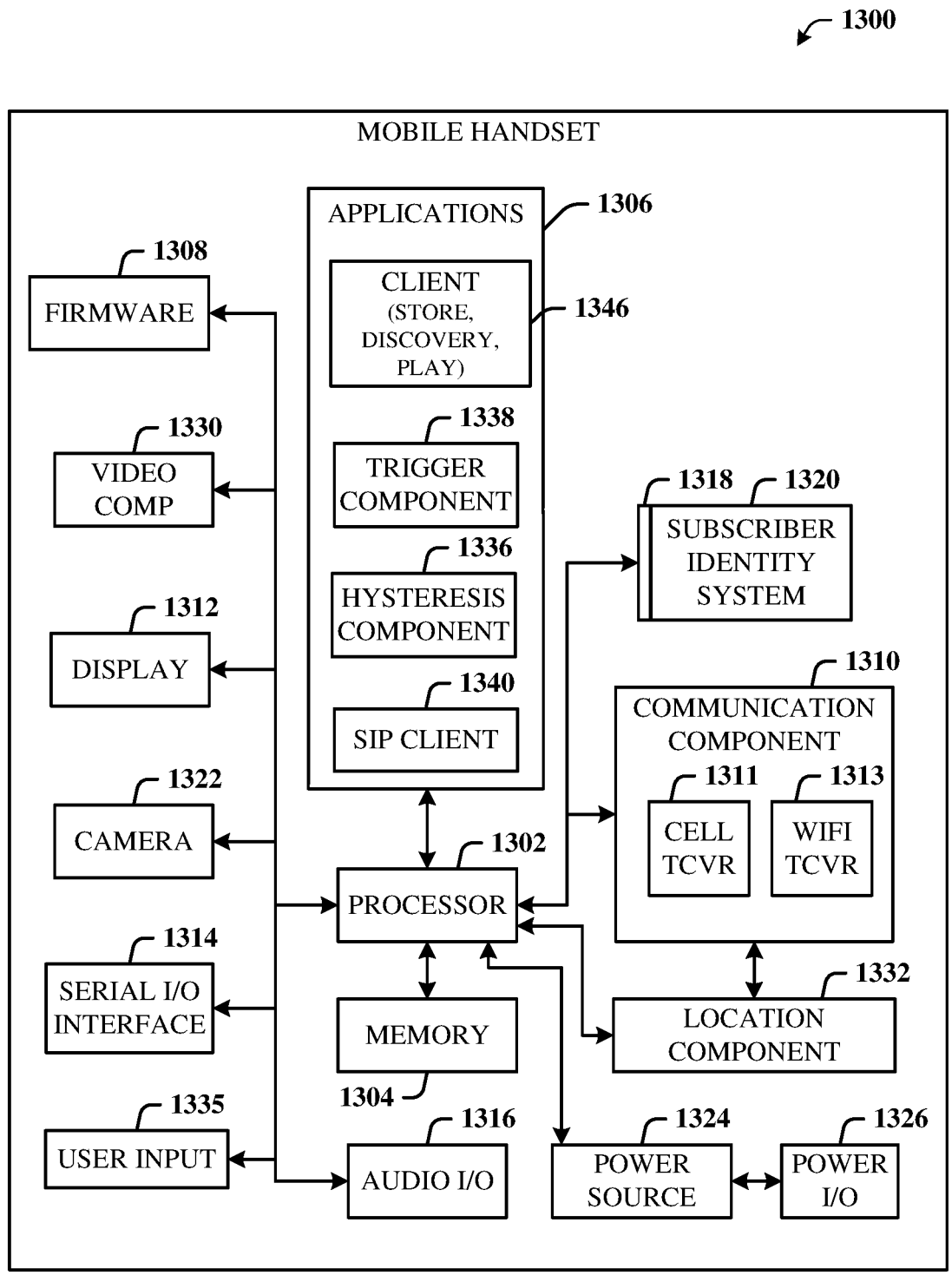
FIG. 13 illustrates an example block diagram of a mobile handset that can be operable to execute processes and methods in accordance with various aspects and embodiments of the subject disclosure.

Referring now to FIG. 13, illustrated is a schematic block diagram of a mobile device 1300 (which can be, for example, communications device 140, or in some example embodiments, user premises device 230) capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic data stores, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1300 comprises a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 comprises a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also comprises a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, comprises an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering technique communications devices to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic data store, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a data store and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of communications device. A processor also can be implemented as a combination of computing processing units.

In the subject specification, terms such as "store," "data store," "data storage," "database," "repository," "queue", "storage device," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "communications device," "user device," "mobile device," "mobile," station," "access terminal," "terminal," "handset," and similar terminology, can generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A device, comprising:
a processor; and
a memory that stores executable instructions that, when executed by the processor, facilitate performance of operations, comprising:
receiving image data representative of images of physical objects captured at locations at times;
receiving signal data representative of signals from communications devices at the locations at the times; and
determining that a physical object of the physical objects is correlated with a communications device of the communications devices, based on determining that the physical object appears in a group of the images captured at respective locations of the locations and respective times of the times, and the communications device produced a group of the signals at the respective locations and the respective times.

2. The device of claim 1, wherein the signal data comprises device identifications of the communications devices.

3. The device of claim 2, wherein the device identifications enable respective user identities to be determined based on a subscriber location registry.

4. The device of claim 1, wherein the operations further comprise, in response to determining that physical object is correlated to the communications device, storing record data comprising a first data element representative of physical object and a second data element associated with the communications device.

5. The device of claim 4, wherein the operations further comprise:
determining a user identity associated with the communications device; and
storing record data comprising a third data element representative of the user identity.

6. The device of claim 1, wherein the physical objects comprise identifiable features.

7. The device of claim 1, wherein physical object comprises a motor vehicle, and wherein an identifiable characteristic of the motor vehicle comprises a license plate number of the motor vehicle.

8. The device of claim 1, wherein the signals were received by receivers associated with the locations.

9. The device of claim 8, wherein the receivers are each distinct from an image capture device used to capture the images at the locations.

10. A method, comprising:
facilitating, by a device comprising a processor, receiving image data representative of images of physical objects captured at locations at times, wherein the physical objects are not humans;
facilitating, by the device, receiving signal data representative of signals from communications devices at the locations at the times; and
determining, by the device, that a physical object of the physical objects is correlated with a communications device of the communications devices, based on determining that the physical object appears in a group of the images captured at respective locations of the locations and respective times of the times, and the communications device produced a group of the signals at the respective locations and the respective times.

11. The method of claim 10, wherein the signals comprise a Wi-Fi signal.

12. The method of claim 10, wherein the signals comprise a cellular signal.

13. The method of claim 10, wherein the signals comprise a radio frequency identification signal.

14. The method of claim 10, wherein the signal data comprises device identifications of the communications devices, and wherein the device identifications enable respective user identities to be determined based on subscriber information stored in a subscriber location registry.

15. The method of claim 10, further comprising, determining that physical object is correlated to the communications device, storing, by the device, record data comprising a first data element representative of physical object and a second data element associated with the communications device.

16. The method of claim 15, further comprising:
determining a user identity associated with the communications device; and
storing, by the device, record data comprising a third data element representative of the user identity.

17. A non-transitory machine-readable medium, comprising executable instructions that, when executed by a processor, facilitate performance of operations, comprising:
receiving image data representative of images of physical objects captured at a location at times, wherein the physical objects are not humans;
receiving signal data representative of signals from devices at the location at the times; and
determining that a physical object of the physical objects is correlated with a device of the devices, based on determining that the physical object appears in a group of the images captured at respective locations of the locations and respective times of the times, and the device produced a group of the signals at the respective locations and the respective times.

18. The non-transitory machine-readable medium of claim 17, wherein the signals were received by a receiver associated with the location, and wherein the receiver is not a component of an image capture device used to capture the images at the location.

19. The non-transitory machine-readable medium of claim 17, wherein the operations further comprise using a device identification that is associated with the device to determine a user identity.

20. The non-transitory machine-readable medium of claim 19, wherein the operations further comprise storing record data comprising a first data element representative of the user identity, a second data element associated with the device, and a third data element associated with the physical object.

* * * * *